(12) United States Patent
Milirud et al.

(10) Patent No.: US 8,947,840 B1
(45) Date of Patent: Feb. 3, 2015

(54) METHOD AND APPARATUS FOR IMPROVING THE SIGNAL INTEGRITY OF HIGH-SPEED SERIAL DATA RECEIVERS USING COUPLED INDUCTORS

(75) Inventors: Vadim Milirud, Vancouver (CA); Tomas Dusatko, Vancouver (CA); Predrag Acimovic, Burnaby (CA)

(73) Assignee: PMC-Sierra, Inc., Sunnyvale, CA (US)

( * ) Notice: Subject to any disclaimer, the term of this patent is extended or adjusted under 35 U.S.C. 154(b) by 1269 days.

(21) Appl. No.: 12/781,335

(22) Filed: May 17, 2010

Related U.S. Application Data

(60) Provisional application No. 61/254,595, filed on Oct. 23, 2009.

(51) Int. Cl.
 *H02H 9/00* (2006.01)

(52) U.S. Cl.
 USPC .......................................................... 361/56

(58) Field of Classification Search
 CPC ...................................... H01L 27/248
 USPC .......................................................... 361/56
 See application file for complete search history.

(56) References Cited

U.S. PATENT DOCUMENTS

| | | |
|---|---|---|
| 3,155,927 A | 11/1964 | True |
| 5,477,204 A | 12/1995 | Li |
| 5,969,929 A | 10/1999 | Kleveland et al. |
| 7,005,939 B2 * | 2/2006 | Zerbe et al. .................... 333/100 |
| 7,265,433 B2 * | 9/2007 | Pillai et al. ...................... 257/531 |
| 7,463,112 B1 | 12/2008 | Groves |
| 7,470,968 B2 | 12/2008 | Babcock et al. |
| 7,586,987 B2 | 9/2009 | Vorenkamp et al. |
| 2009/0206962 A1 | 8/2009 | Chou et al. |

OTHER PUBLICATIONS

Galai, et al.; Broadband ESD Protection Circuits in CMOS Technology; IEEE Journal of Solid-State Circuits; vol. 38, No. 12; Dec. 2003; Institute of Electrical and Electronics Engineers.*

Shekhar, et al.; Bandwidth Extension Techniques for CMOS Amplifiers; IEEE Journal of Solid-State Circuits; vol. 41, No. 11; Nov. 2006; Institute of Electrical and Electronics Engineers.

* cited by examiner

*Primary Examiner* — Jared Fureman
*Assistant Examiner* — Ann Hoang
(74) *Attorney, Agent, or Firm* — Knobbe Martens Olson & Bear LLP

(57) ABSTRACT

Methods and apparatus improve the signal integrity of high-speed integrated circuits. Disclosed is a passive network for an input to a receiver. One embodiment of the passive network has two coupled inductors to improve both return loss and insertion loss characteristics. A shunt inductor is connected in series with the termination resistance, while a series inductor is placed in series between the pad and receiver circuitry. By exploiting deliberately-introduced mutual coupling between these two inductors, an area-efficient passive network is created that improves both the return loss and input bandwidth.

21 Claims, 14 Drawing Sheets

METHOD AND APPARATUS FOR IMPROVING THE SIGNAL INTEGRITY OF HIGH-SPEED SERIAL DATA RECEIVERS USING COUPLED INDUCTORS

CROSS-REFERENCE TO RELATED APPLICATION

This application claims the benefit under 35 U.S.C. §119 (e) of U.S. Provisional Application No. 61/254,595, filed Oct. 23, 2009, the entirety of which is hereby incorporated by reference.

BACKGROUND

1. Field of the Invention

Embodiments of the invention generally relate to electronics, and more particularly, to high speed data links for integrated circuit devices.

2. Description of the Related Art

Reliable high speed serial links between integrated circuit devices can be difficult to implement with rising data rates. State of the art serial links exceed 10 gigabits per second (Gbps). In receivers, electrostatic discharge (ESD) protection, input pad and packaging requirements adversely affect the signal integrity of device-to-device communication links by adding parasitic capacitance to inputs.

Some receivers of serial communication systems use relatively limited analog processing. For example, in these receivers, often only a high-speed analog-to-digital converter (ADC) is present for the analog section. Other functions can be performed digitally, such as equalization and clock and data recovery (CDR). An absence of front-end analog equalization imposes relatively severe demands on the signal integrity of the receiver.

Return loss (RL) at the IC-package interface and insertion loss (IL) from frequency dependent attenuation of on-chip interconnects are two factors affecting the signal integrity of an input data signal.

Discontinuities and impedance mismatches can occur at interfaces between an integrated circuit (IC) and its package. A transmission channel can include, for example, board traces, backplane traces, and/or short lengths of cable. To minimize the magnitude of reflections in the channel (return loss), ideally the input impedance of the receiver ($Z_{in}$) should be matched complex conjugate of the characteristic impedance ($Z_0$) of the transmission line, e.g., real($Z_{in}$)=$Z_0$ and Img ($Z_{in}$)=0. Mismatches in impedance cause some of the signal power to be reflected back into the transmission channel, which typically results in increased jitter. This increased signal jitter directly translates to a reduction in the overall performance of the link.

The larger the impedance discontinuity, the greater the degradation in the quality of the input serial data signal. In the frequency domain, the effect of these discontinuities can be seen as sharp notches in the channel response and can be somewhat reduced using nonlinear equalizers. To minimize the signal degradation due to poor RL, a receiver should be properly matched to the impedance of the transmission line.

The frequency-dependent insertion loss of on-chip interconnects can cause inter-symbol interference (ISI). By flattening the overall amplitude response of the receive path, a linear equalizer can partially compensate for insertion loss.

A power efficient way to implement linear equalization is by only using passive reactive components. A typical goal of an input circuit is to present a constant, real 50 ohm (Ω) termination resistance to the external transmission line (assuming the transmission line has a 50 ohm characteristic impedance), and to provide a frequency dependent voltage gain that compensates for losses. In real systems, a more realistic requirement is to create a 50Ω termination from DC up to about ¾ of the baud rate, where most of the digital signal energy is concentrated. Similarly, insertion loss is also usually of interest up to ¾ of the baud rate.

FIG. 3 illustrates a representative power spectrum of serial non-return-to-zero (NRZ) data. Frequency is expressed along a horizontal axis. Power is expressed along a vertical axis. The majority of the signal energy is contained up to about 75% of the baud rate $f_0$. Thus, in the case of multi-gigabit transmission systems, a significant amount of signal energy can be reflected if the input impedance is not relatively well matched at high frequencies.

FIG. 1 illustrates an example of a conventional input circuit for an integrated circuit assembly including an on-chip pad 102, an electrostatic discharge (ESD) protection circuit 104, a resistive termination $R_t$, and a receiver (RX). Those components are also sources of parasitic capacitance that can be modeled by two separate capacitors $C_1$, $C_2$. Resistance $R_p$ models on-chip routing resistance.

As the link rate of serial data transceivers increases, parasitic on-chip capacitance and resistance can severely degrade the quality of the input signal when it reaches the on-chip receiver circuitry (for example, ADC, sampler, amplifier, etc.).

Conventional solutions to discontinuities and impedance mismatches include, for example, broadband matching networks, improving insertion loss, or combinations of both. U.S. Pat. No. 7,005,939 to Zerbe, et al, describes using a series inductive element to isolate the $C_1$ and $C_2$ capacitance and to prevent the capacitance from summing. The series inductance is placed between the ESD protection circuit and the termination resistor $R_t$, thereby effectively reducing the capacitance present at the pad. U.S. Pat. No. 7,265,433 to Pillai, et al, discloses a T-coil inserted between the ESD protection circuit and the termination resistor Rt. The receiver is connected at the T-junction of the T-coil. Such a configuration transforms capacitance $C_2$ into a constant real 50Ω termination resistance in parallel with capacitance $C_1$. While Pillai's technique nulls the $C_2$ reactance across frequency, the $C_1$ reactance remains present at the pad.

FIG. 2 illustrates another conventional example of a serial data link and a receiver. A transmitter 202 drives a transmission channel 204, such as board traces, backplane traces, and/or cables. A receiver chip 206 has a termination resistor $R_t$, a primary ESD protection circuit 208, a current-limiting resistor R 210, a secondary ESD protection circuit 212 and a receiver circuit RX 214. The ESD protection is provided by two separate circuits (primary 208 and secondary 212).

The primary ESD protection circuit 208 is typically connected directly to the input pad 102 (FIG. 1) and typically includes a diode placed between the signal line and ground, and another diode placed between the signal line and the local voltage supply rail. In advanced sub-micron CMOS technologies, secondary protection in the form of a voltage clamp (secondary ESD protection circuit 212) is commonly used at the receiver circuit RX 214 input in order to limit the voltage at the MOSFET transistors gates in the receiver circuit RX 214.

A drawback of the technique illustrated in FIG. 2 is that the total capacitance associated with the primary ESD protection circuit 208 and the secondary ESD protection circuit 212 can be relatively large. In the case of multi-gigabit communication links, the capacitance at the input of the receiver circuit RX 214 can be a limiting factor in system performance. As data rates increase with each successive generation of technology, the problems associated with input capacitance become more acute. The parasitic capacitance at the receiver chip input due to signal trace routing and ESD protection circuitry typically render the input impedance of the receiver frequency dependent. At low frequencies, the input impedance is about equal to the DC resistance of the termination resistor $R_t$. At higher frequencies, the impedance is lowered due to both the ESD protection capacitance and the pad capacitance. Thus, the impedance mismatch at the input increases with increasing frequency.

The current-limiting resistor R 210 disposed between the primary ESD protection circuit 208 and the secondary ESD protection circuit reduces the overall size of the ESD protection circuits. The use of the current-limiting resistor R 210 permits the physical size of the secondary ESD protection circuit 212 to be reduced since it does not have to be designed to carry the full ESD discharge current. Thus, there is a tradeoff between the capacitance added by the secondary ESD protection circuit 212 and the size of the current-limiting resistor R 210. The secondary protection can be made smaller, but the resistor must be made larger to limit the current (and vice versa).

FIG. 4 illustrates a lumped-element model of the circuit described earlier in connection with FIG. 2. The primary ESD protection circuit 208 and the parasitic pad capacitance are represented as a single capacitance $C_{p1}$ 402. The secondary ESD protection circuit 212 and input capacitance of the receiver circuit RX 214 is lumped into another capacitance $C_{p2}$ 404. Modeled resistance $R_p$ 406 represents the sum of both the parasitic resistance of the routing trace and explicitly added current-limiting resistance R 210 which can be upwards of 200Ω depending on the technology and design requirements. As illustrated in FIG. 4, the termination resistor $R_t$ is placed on the transmission channel side of the modeled resistance $R_p$ to avoid a voltage division with the modeled resistance $R_p$. In the illustrated ESD configuration, if the termination resistance $R_t$ were to be placed in parallel with $C_{p2}$ 404, it would create a voltage divider with R–p ($R_t/(R_t+R_p)$).

Along with the degradation caused by impedance mismatches from the ESD protection circuits and parasitic capacitances at high frequency, attenuation (insertion loss) of the input signal on-chip also reduces the overall performance of the link. The quality of the input serial data signal is further degraded by attenuation associated with the on-chip parasitic capacitance $C_{p2}$ and modeled resistance $R_p$. The modeled resistance $R_p$ and parasitic capacitance $C_{p2}$ form a low-pass filter, which decreases the magnitude of the input signal as seen by the receiver circuitry, which increases inter-symbol interference (ISI). When the bandwidth of the input signal is limited by the current-limiting resistance $R_p$, trace resistances, and the parasitic capacitances, then the input signal will be significantly attenuated and distorted by the time it reaches the input of the receiver circuit RX 214. Greater ESD protection uses relatively larger devices, which increases the amounts of parasitic capacitances $C_{p1}$ 402 and $C_{p2}$ 404, while the addition of secondary protection in advanced CMOS technologies typically uses secondary voltage clamps 212 and a current-limiting resistor R. Thus, a tradeoff exists between the level of ESD protection and operating performance.

SUMMARY

Insertion loss and return loss characteristics associated with the use of primary and secondary ESD protection circuits are improved by embodiments of the invention. Embodiments of the invention are applicable to both single-ended and to differential transmission channels.

The invention includes an input circuit for a receiver of a high-speed serial data signal, wherein a shunt inductor ($L_1$) is disposed in series between a node of an input pad/primary ESD protection circuit and a termination resistor, and wherein a series inductor ($L_2$) is disposed in series between the node of the input pad/primary ESD protection circuit and a secondary ESD protection circuit. The shunt inductor ($L_1$) and the series inductor ($L_2$) can optionally be deliberately mutually coupled. For example, the shunt inductor ($L_1$) and the series inductor ($L_2$) can substantially overlap physically to enhance the desired deliberate mutual coupling between the shunt inductor ($L_1$) and the series inductor ($L_2$). The series inductor $L_2$ can be a single inductor or can be multiple inductors.

The invention also includes an input circuit for a receiver of a high-speed serial data signal passive filter comprising a single explicit inductor disposed in a signal path between a node of an input pad/primary ESD protection circuit and a secondary ESD protection circuit.

Based on the values for the passive elements used, a wide range of frequency responses is possible to implement.

BRIEF DESCRIPTION OF THE DRAWINGS

These drawings and the associated description herein are provided to illustrate specific embodiments of the invention and are not intended to be limiting.

DETAILED DESCRIPTION OF SPECIFIC EMBODIMENTS

Although particular embodiments are described herein, other embodiments of the invention, including embodiments that do not provide all of the benefits and features set forth herein, will be apparent to those of ordinary skill in the art.

The data rate of serial links continues to increase with every successive generation. The performance of these systems becomes increasingly constrained by signal integrity. Interfacing a high-speed integrated circuit (IC) with external transmission lines (PCB traces, backplanes, cables) can become difficult at these high data rates. Return loss due to mismatches between the package and receiver input can cause link jitter. In addition, on-chip attenuation between the input pad and the actual receiver circuitry can distort the signal.

Linear and non-linear active equalizers can be used to compensate for signal integrity issues. However, active equalizers can be complex and use a considerable amount of power. Advantageously, an embodiment of the invention uses passive network alternatives, which saves complexity and power. In one embodiment, the only form of equalization used is provided by these passive networks. In an alternative embodiment, active equalizers can be used in combination with disclosed passive networks.

Figure 1:
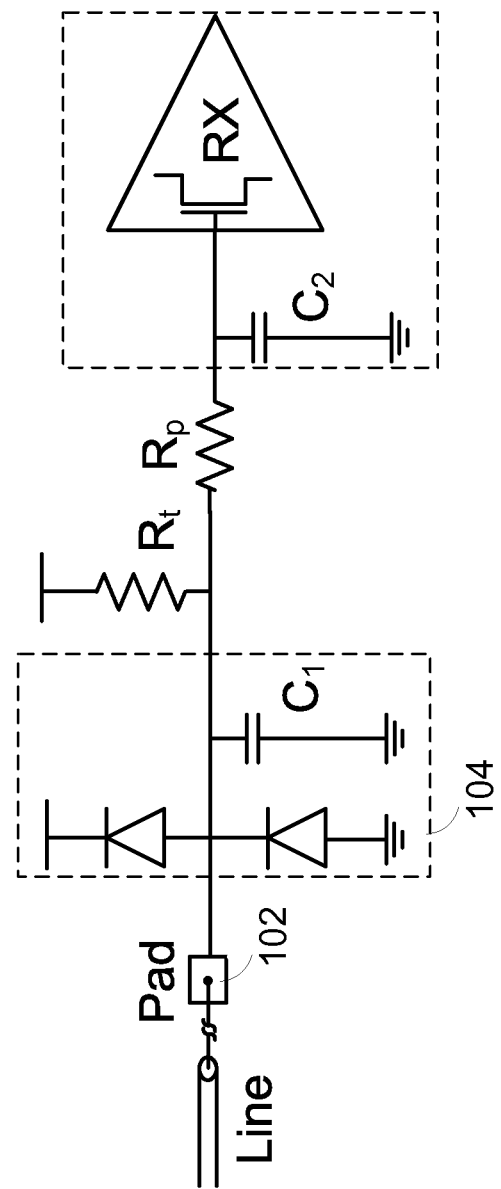
FIG. 1 illustrates a conventional example of a serial data link and a receiver.
Figure 2:
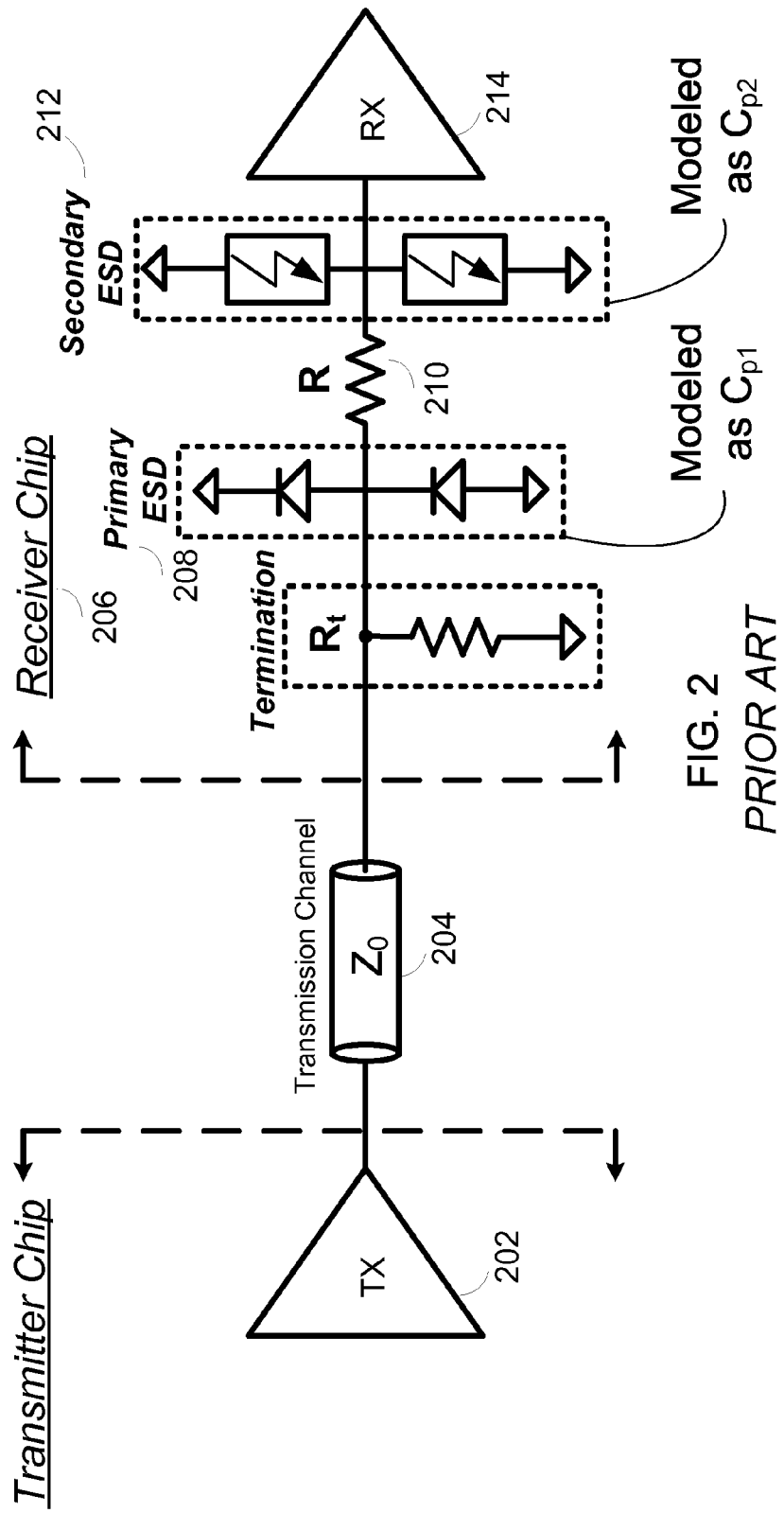
FIG. 2 illustrates another conventional example of a serial data link and a receiver.
Figure 3:
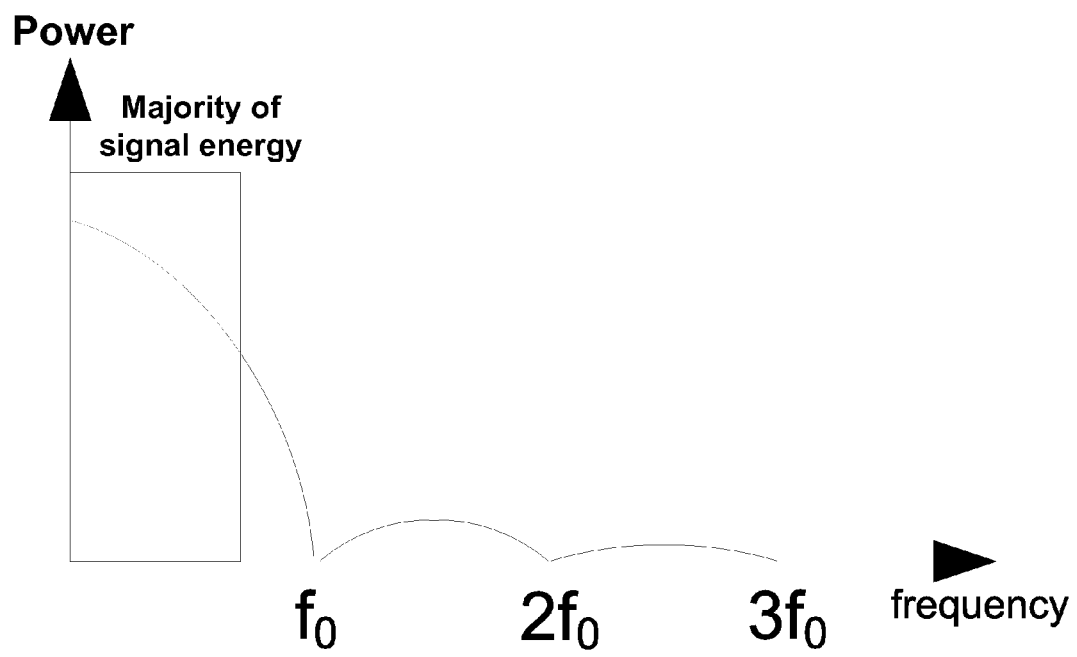
FIG. 3 illustrates an example of a power spectrum for a non-return-to-zero (NRZ) signal.
Figure 5:
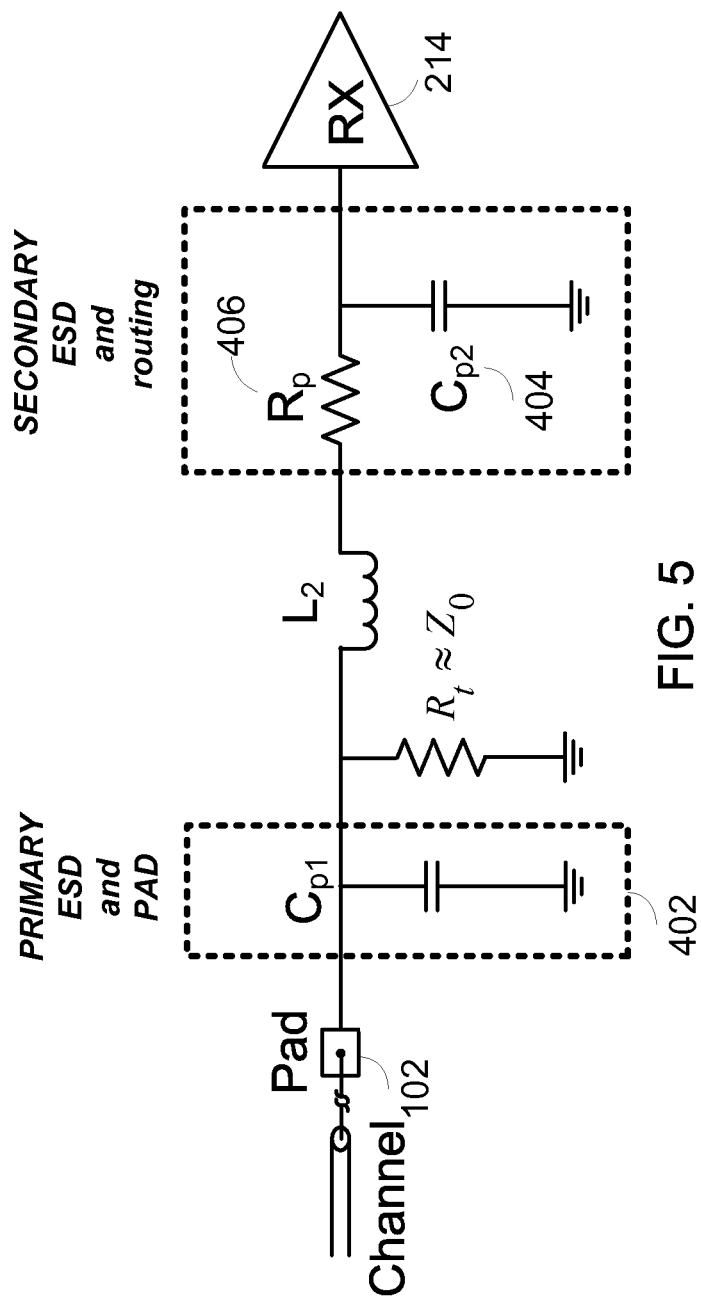
FIG. 5 illustrates a lumped-element model for an embodiment of the invention with a single series inductor.

FIG. 5 illustrates a lumped-element model for an embodiment of the invention. An explicit inductive element $L_2$ improves return loss and insertion loss characteristics. The series inductor $L_2$ corresponds to an explicit inductance that is deliberately introduced and not merely a parasitic inductance. In one embodiment, the series inductor $L_2$ has at least 0.1 nanohenries (nH) of inductance. The series inductor $L_2$ is disposed in the signal path between a node including the signal input pad 102 and a node with the input of the receiver circuit RX 214, thus splitting the parasitic capacitance into two separate smaller parasitic capacitances $C_{p1}$ 402, $C_{p2}$ 404. In FIG. 5, as well as FIGS. 6-8 and FIGS. 9-11, while the parasitic capacitances $C_{p1}$ 402, $C_{p2}$ 404, $C_{p1P}$, $C_{p1N}$, $C_{p2P}$, and $C_{p2N}$ are illustrated, they correspond to the ESD protection circuits described earlier in connection with FIG. 2. The model shows only the parasitic capacitances because during the normal operation that is simulated, there is no ESD discharge event to trigger operation of the ESD protection circuits. On one side of the series inductor $L_2$ is the input pad capacitance ($C_{pad}$) and primary ESD capacitance ($C_{ESDp}$) with the total capacitance being equal to $C_{p1}=C_{pad}+C_{ESDp}$. In one embodiment, the node formed by the pad 102, the primary ESD protection circuit (modeled by parasitic capacitance $C_{p1}$ 402), and an end of the series inductor $L_2$ is routed such that the primary ESD protection circuit is in the signal path between the pad 102 and the series inductor $L_2$ (and a shunt inductor $L_1$ to be described later). In this case, the inductor's metal traces then can be made smaller as they would not have to be able to handle the full current of an ESD event, which can yield a smaller overall design.

Further, the illustrated model of the embodiment of FIG. 5 differs from the conventional art of U.S. Pat. No. 7,005,939 as the resistive termination $R_t$ of the illustrated embodiment is connected to the pad 102 side of the series inductor $L_2$ rather than to the receiver circuitry input as described in U.S. Pat. No. 7,005,939 (see FIG. 4 of U.S. Pat. No. 7,005,939). As discussed earlier in connection with FIG. 4, the modeled resistance $R_p$ 406 can include parasitic routing resistance and/or an explicitly added current-limiting resistor R to limit the current of an ESD event for the secondary ESD protection circuit, which is modeled as parasitic capacitance $C_{p2}$. The current-limiting resistor can be a poly resistor or can correspond to on-chip parasitic resistance. Since the value of the modeled resistance $R_p$ used in advanced technologies is commonly upwards of 200Ω, the termination resistor $R_t$ should be connected on the transmission channel side of the modeled resistance $R_p$. Since the parasitic capacitance $C_{p2}$ 404 associated with the secondary ESD protection circuit can be relatively large, the value of inductance for the series inductor $L_2$ used to compensate for the capacitance will typically also be relatively large, which can limit the overall bandwidth of the input path. To improve the bandwidth for relatively high data rates, such as data rates greater than 10 Gbps, it would be desirable to reduce the parasitic capacitance $C_{p2}$ 404 associated with the secondary ESD protection circuit. However, with conventional structures, reducing the parasitic capacitance $C_{p2}$ 404 is not practical. Insertion of a relatively large current-limiting resistance R to accompany the smaller ESD protection would then reduce the signal voltage at the receiver input due to the voltage divider that the modeled resistance $R_p$ would form with the termination resistor $R_t$.

In contrast to the configuration taught in U.S. Pat. No. 5,969,929 to Kleveland, et al., an embodiment of the invention can be advantageously implemented using a single series inductor $L_2$ and without the costs associated with distributed inductance and multiple ESD protection circuits. While using multiple inductors and multiple smaller ESD protection circuits as taught by U.S. Pat. No. 5,969,929 to Kleveland, et al., can mitigate the problem associated with the relatively large amount of parasitic capacitance from large ESD protection circuits, the use multiple inductive elements can consume a relatively large amount of chip space, so that the implementation cost can be relatively high. A much more cost efficient solution is described by an embodiment corresponding to the model illustrated in FIG. 5, which can be implemented with only a single series inductor $L_2$, which reduces the overall area and cost. Of course, the single series inductor $L_2$ can be formed from, for example, a series combination of smaller inductors. However, an embodiment corresponding to the model of FIG. 5 does not need to use multiple distributed inductors and ESD protection circuits.

The presence of the series inductor $L_2$ changes the bandwidth-limiting single real-pole RC network formed by the parasitic capacitance $C_{p2}$ and the modeled resistance $R_p$ into a set of complex poles. By appropriately selecting the amount of inductance for the series inductor $L_2$, the input bandwidth of the input signal can be increased, which improves insertion loss characteristics. With complex network poles, peaking in the transfer function can be included by appropriate selection of the value of the modeled resistance $R_p$ in order to help equalize loss in the transmission channel.

Figure 6:
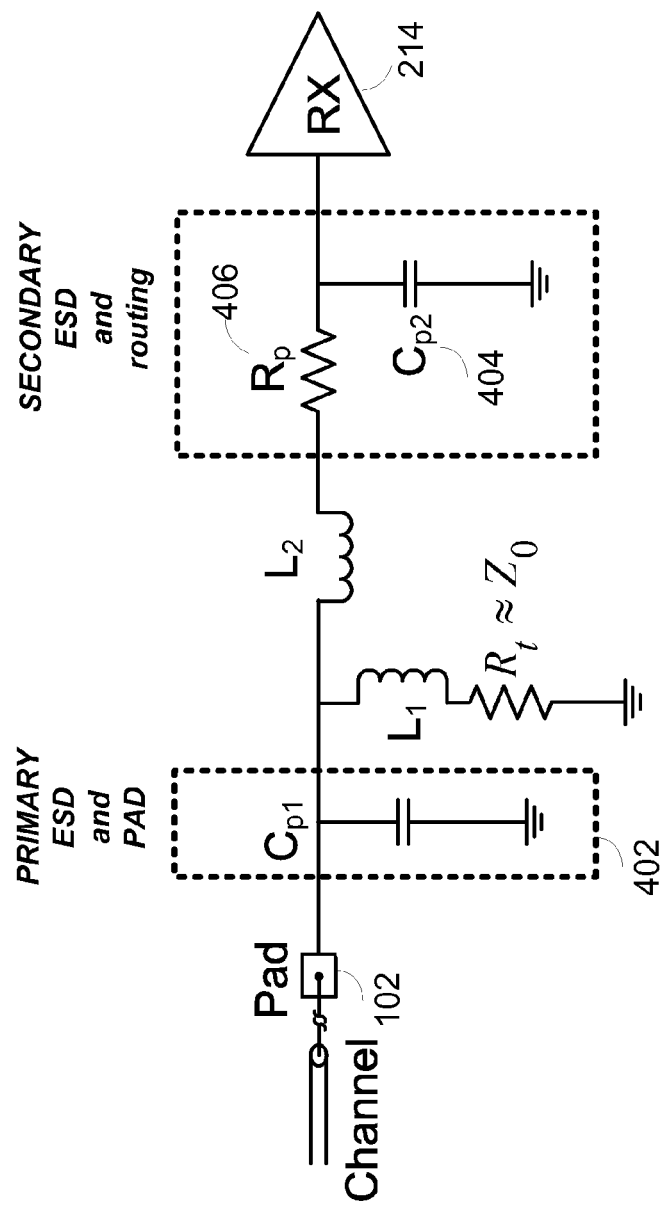
FIG. 6 illustrates a lumped-element model for an embodiment of the invention with the series inductor and a shunt inductor.

FIG. 6 illustrates a lumped-element model for another embodiment of the invention, wherein at least two explicit inductors are used. In addition to the series inductor $L_2$ described earlier in connection with the model of the embodiment of FIG. 5, a shunt inductor $L_1$ is disposed in shunt with the signal path. The shunt inductor $L_1$ corresponds to an explicit inductance that is deliberately introduced and not merely a parasitic inductance. The shunt inductor $L_1$ is disposed in the signal path in series between the input pad 102 and the termination resistor $R_t$, but is not in series with the series inductor $L_2$, as illustrated in FIG. 6. Further, the shunt inductor $L_1$ should be in the signal path between a node with the pad 102 and the termination resistor $R_t$, but not between the termination resistor $R_t$ and ground or some other voltage reference. In one embodiment, the shunt inductor $L_1$ is combined with distributed series inductances and ESD protection circuits as disclosed in U.S. Pat. No. 5,969,929 to Kleveland, et al., the disclosure of which is hereby incorporated by reference herein.

Figure 7:
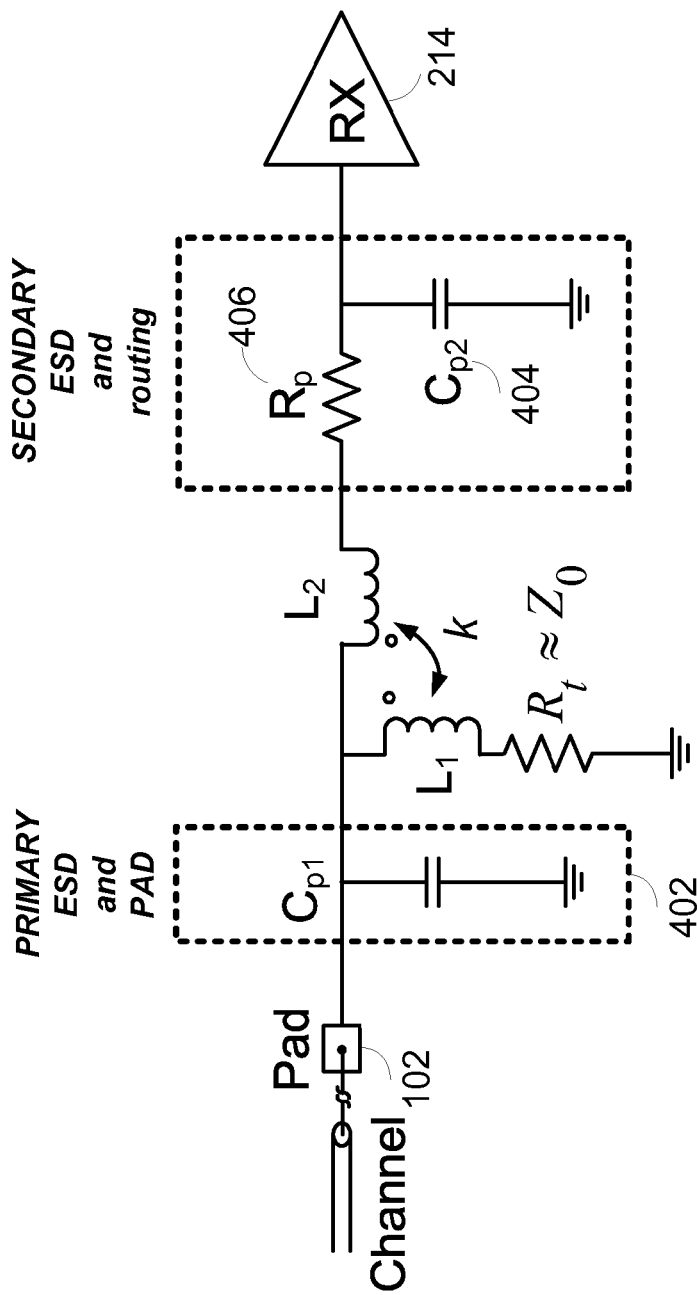
FIG. 7 illustrates a lumped-element model for an embodiment of the invention with mutual coupling between the series inductor and the shunt inductor.
Figure 8A:
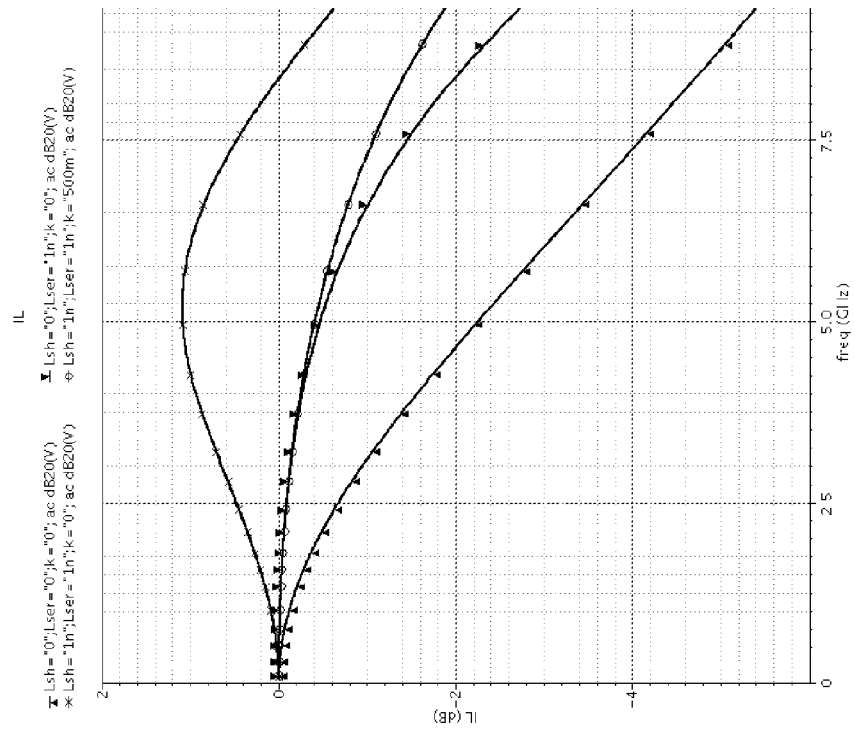
FIG. 8A is a chart graphically illustrating the return loss characteristics for four different inductor configurations.
Figure 8B:
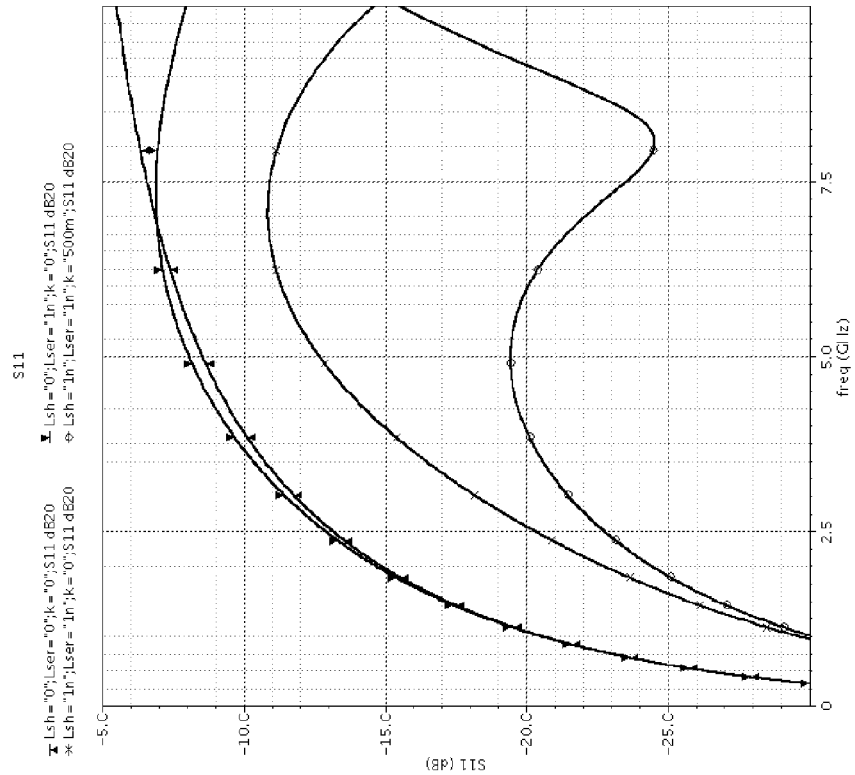
FIG. 8B is a chart graphically illustrating the insertion loss characteristics for the four inductor configurations of FIG. 8A.

The shunt inductor $L_1$ helps to compensate for parasitic capacitance $C_{p1}$ 402 and $C_{p2}$ 404 by adding a second parallel resonance to the input path. When used in conjunction with the series inductor $L_2$, the shunt inductor $L_1$ further increases the bandwidth of the input signal path from the pad 102 to the receiver circuit RX 214. The shunt inductor $L_1$ both increases the frequency of the dominant pole in the system and introduces a zero in the transfer function, which reduces the slope of the high-frequency roll-off. In one example, the embodiment illustrated in FIG. 5 can have about twice the bandwidth of the embodiment illustrated in connection with FIG. 4. In addition, the shunt inductor $L_1$ can improve the return loss at frequencies near the half-baud rate by adding another parallel resonance at a lower frequency. In the configuration of FIG. 6, the series inductor $L_2$ and the shunt inductor $L_1$ are implemented using separate inductors. While mutual coupling between inductors $L_1$ and $L_2$ is not intentionally introduced for an embodiment modeled in FIG. 6, in practice, there will typically be at a non-zero amount of mutual coupling present. For the purposes of simulation, a coupling coefficient of 0 was used (FIGS. 8A and 8B). In the configuration of FIG. 7, mutual coupling between inductors $L_1$ and $L_2$ is deliberately introduced.

FIG. 7 illustrates a lumped-element model for an embodiment of the invention with mutual coupling between the series inductor $L_2$ and the shunt inductor $L_1$. In conventional circuits, mutual coupling between separate inductors is typically undesirable and is thus avoided. In the illustrated embodiment of FIG. 7, mutual coupling is deliberately introduced between the series inductor $L_2$ and the shunt inductor $L_1$. The mutual coupling improves the return loss characteristics at frequencies near half baud. With appropriate selection of amounts of inductance for inductors $L_1$ and $L_2$, and for the coupling coefficient k, the input impedance can be matched to the transmission channel over a wider range of frequencies, while still maintaining the bandwidth extension properties of the embodiments described earlier in connection with FIGS. 5 and 6. In one embodiment, since mutual coupling is desirable, the inductors $L_1$ and $L_2$ can be implemented as a single structure, which can reduce the chip area occupied by the inductors $L_1$ and $L_2$ as compared to if the inductors $L_1$ and $L_2$ were implemented using separate structures. In the simulation that will be described later in connection with FIGS. 8A and 8B, a coupling coefficient of 0.5 was used. However, a coupling coefficient for deliberately-introduced mutual coefficient can vary in a very broad range. For example, the magnitude of the coupling coefficient can be in a range of 0.2 to about 0.85. In another example, the magnitude of the coupling coefficient can be in a range of 0.5 to about 0.85. In another example, the magnitude of the coupling coefficient can be in a range of 0.45 to about 0.7. In another example, the magnitude of the coupling coefficient can be in a range of 0.3 to about 0.6. In one embodiment, the shunt inductor $L_1$ has at least 0.1 nanohenries (nH) of inductance, and the series inductor $L_2$ has at least 0.1 nH of inductance.

Inductors $L_1$ and $L_2$ can be fabricated by, for example, using insulation and metallization layers of an integrated circuit. Inductors on integrated circuits are typically realized using conductors arranged in spiral loops. These inductors are typically formed using multiple layers of insulation and metallization. The mutual coupling provides inductors $L_1$ and $L_2$ with a transformer-like characteristic in addition to the conventional storage characteristics of inductors. In one example, to implement the inductors $L_1$ and $L_2$ with mutual coupling, the conductors of the inductors $L_1$ and $L_2$ that form the spiral loops are placed adjacent to each other in the spiral structure. For example, one conductor can be inner to the other for inner and outer loops. In another example, one conductor can be above the other for adjacent loops in the "z" dimension. One example of mutually-coupled inductors is illustrated in U.S. Pat. No. 5,477,204 to Li. Various other configurations will be readily apparent to one of ordinary skill in the art. One example of a structure that can be used will be described later in connection with FIG. 12.

FIG. 8A is a chart graphically illustrating simulations of return loss characteristics (labeled S11) for 4 representative cases from the prior art and embodiments of the invention. FIG. 8B is a chart graphically illustrating simulations of insertion loss characteristics (labeled IL) for the same 4 cases as FIG. 8A. In both FIGS. 8A and 8B, frequency in gigahertz (GHz) is expressed along a horizontal axis, and loss in decibels (dB) is expressed along a vertical axis.

Figure 4:
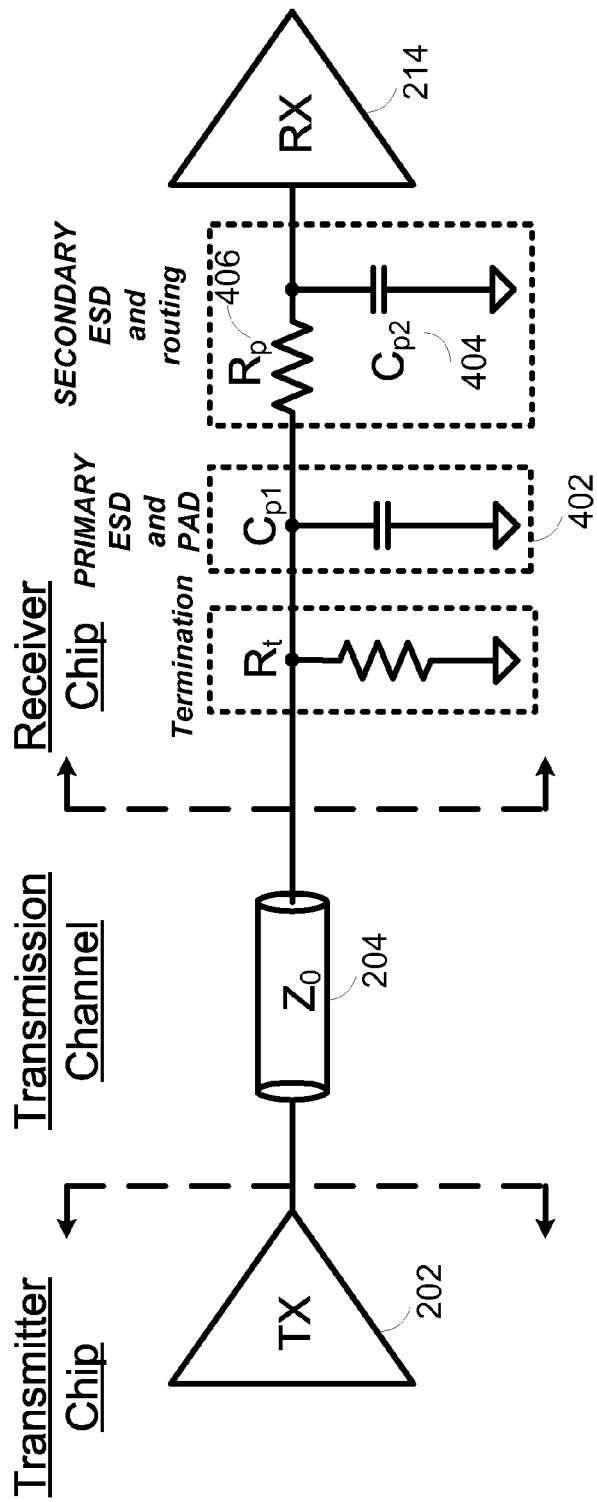
FIG. 4 illustrates a lumped-element model for the conventional circuit of FIG. 2.

The simulations correspond to (1) no shunt inductance ($L_1$) and no series inductance ($L_2$), which corresponds to an example of FIG. 4; (2) no shunt inductance ($L_1$) and 1 nanohenry (nH) of series inductance ($L_2$), which corresponds to an example of FIG. 5; (3) shunt inductance ($L_1$) of 1 nH, series inductance ($L_2$) of 1 nH, and a coupling coefficient k of 0 (no coupling), which corresponds to an example of FIG. 6; and (4) shunt inductance ($L_1$) of 1 nH, series inductance ($L_2$) of 1 nH, with a coupling coefficient k of 0.5, which corresponds to an example of FIG. 7. For all 4 simulations in both charts, a parasitic capacitance values of $C_{p1}$=300 femtofarads (fF), $C_{p2}$=300 fF and a termination resistor and a modeled resistance $R_t$=$R_p$=50Ω are used.

As can be observed in FIGS. 8A and 8B, in the simulation of case (1), without inductors $L_1$ and $L_2$, the bandwidth is relatively low, and the return loss (S11) characteristic is relatively poor. As illustrated by the simulation of case (2), the addition of the series inductor $L_2$ over the simulation of case (1) increases the bandwidth, but the return loss characteristics remains poor. As illustrated by the simulation of case (3), the addition of the shunt inductor $L_1$ along with the series inductor $L_2$ (without mutual coupling) improves the bandwidth significantly and improves the return loss characteristics. As illustrated by the simulation of case (4), the return loss characteristics can be further enhanced by magnetically coupling inductors $L_1$ and $L_2$. In the simulation of case (4), the coupling coefficient k corresponds to 0.5. Although the bandwidth extension for case (4) is not as large as case (3) without mutual coupling, the improvement in return-loss is significant. Note that the bandwidth is still as large (or larger) than the case with only a single inductor described earlier in connection with FIG. 5. Also, by magnetically coupling the two inductors and implementing the inductors in a single structure, the overall area can be reduced.

Figure 9:
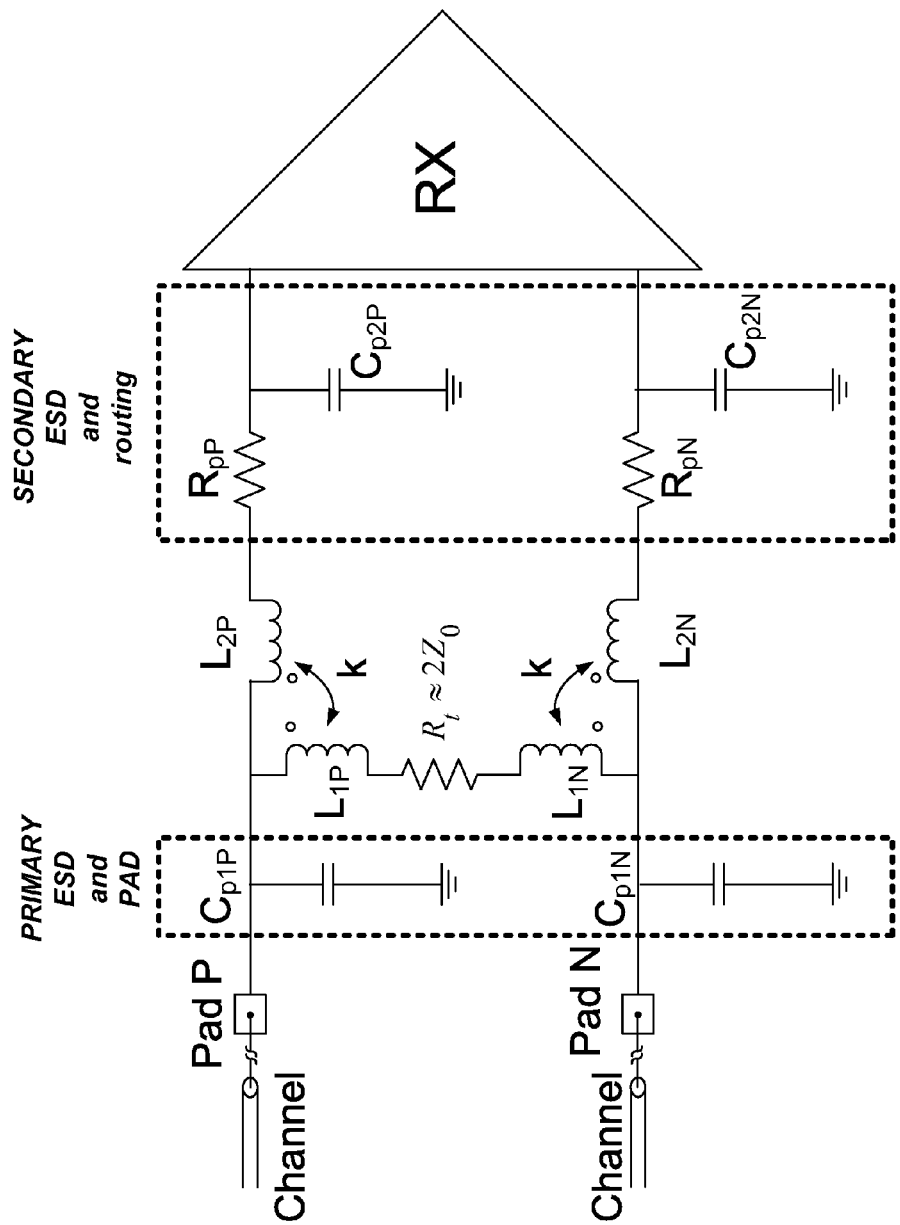
FIG. 9 illustrates a model of an embodiment for a differential signal, wherein the embodiment has mutual coupling between inductors.
Figure 10:
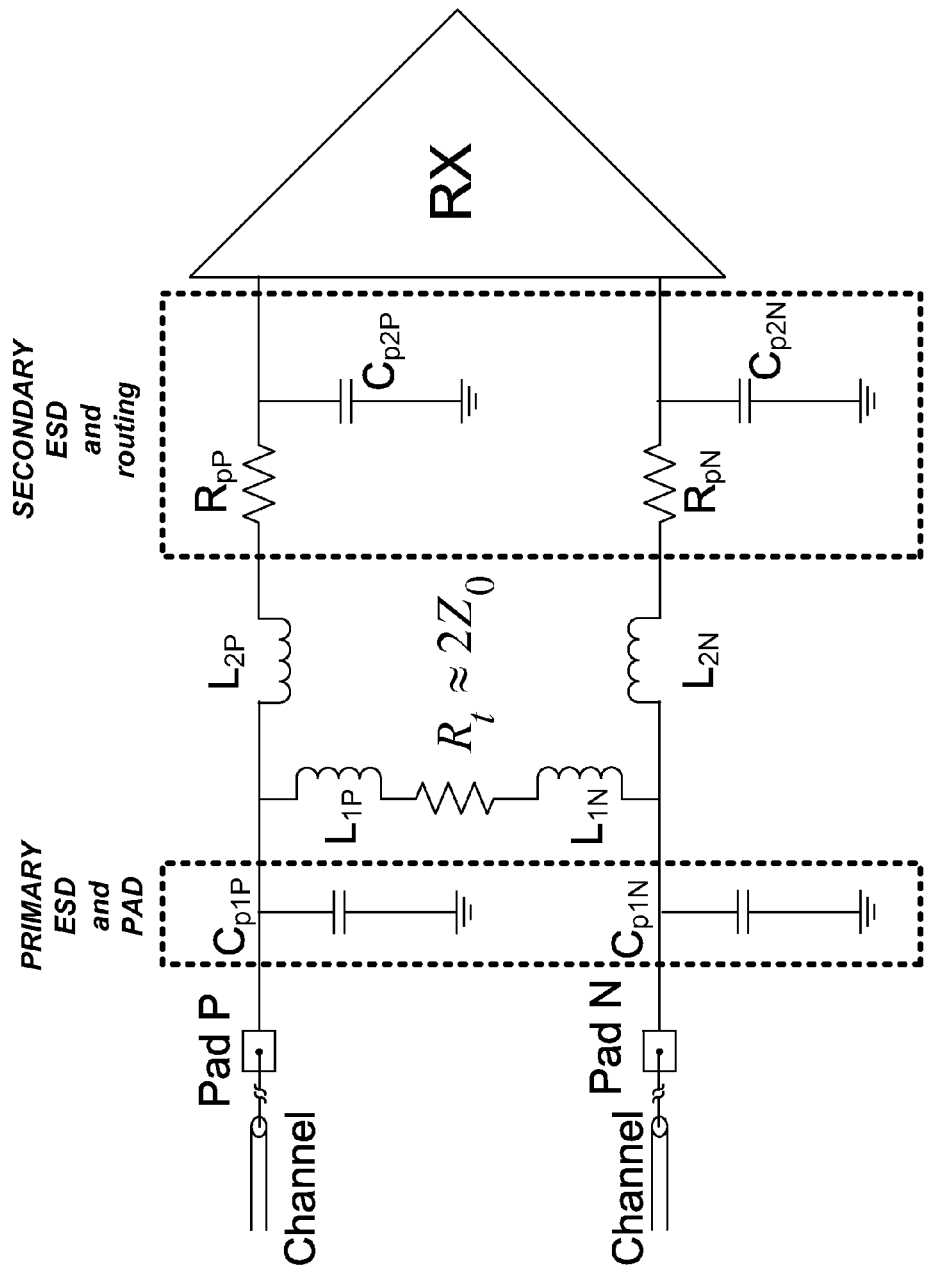
FIG. 10 illustrates a model of an embodiment for a differential signal, wherein the embodiment has series and shunt inductors.
Figure 11:
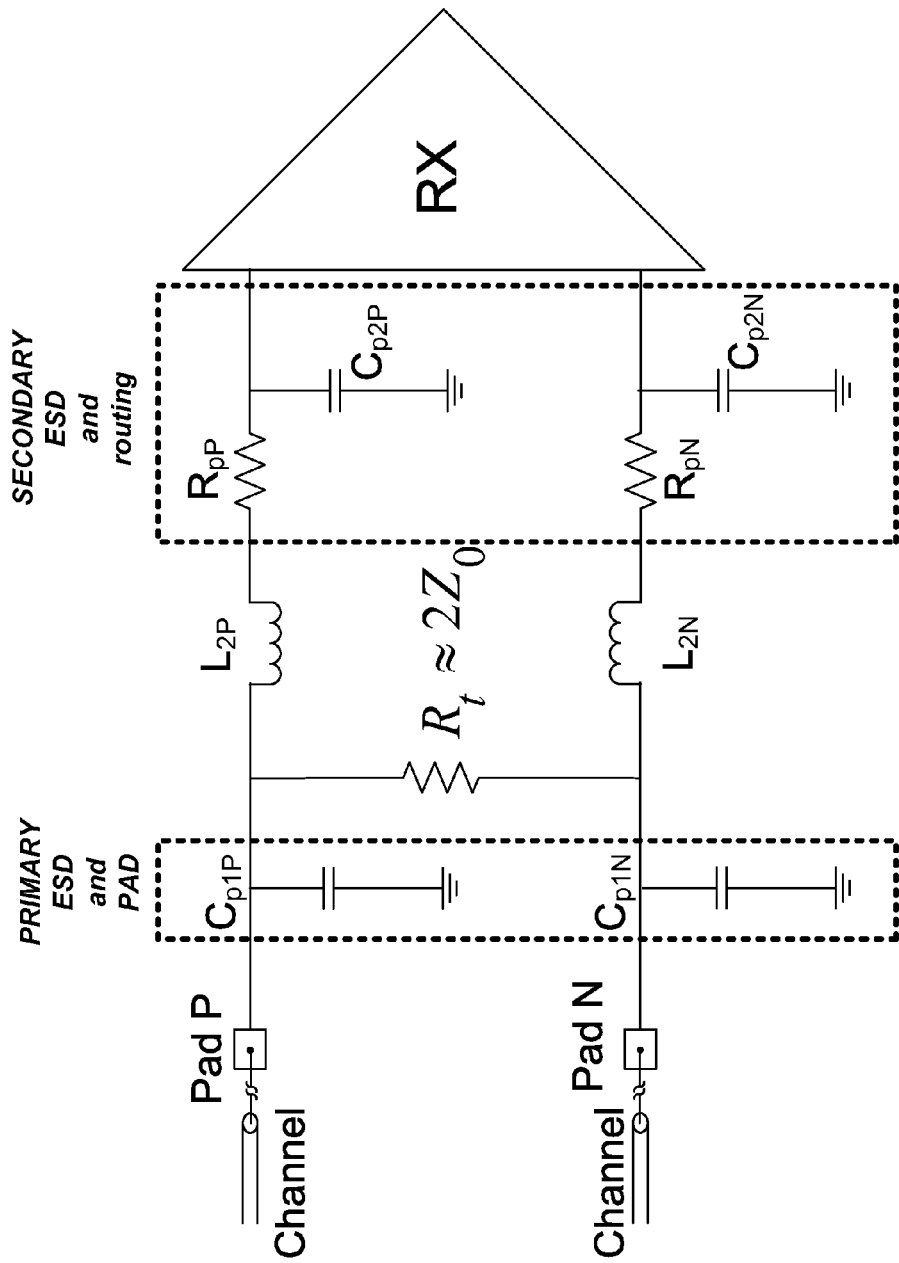
FIG. 11 illustrates a model of an embodiment for a differential signal, wherein the embodiment only has series inductors.

While described in the foregoing in the context of single-ended signals, the principles and advantages of the invention are also applicable to differential signals as illustrated in FIGS. 9-11. FIGS. 9, 10, and 11 correspond to the differential versions of FIGS. 7, 6, and 5, respectively.

The coupling coefficient k of either the single or differential embodiment corresponding to the model depicted in FIG. 7 or FIG. 9 (respectively) can include values for the coupling coefficient k in the range of −0.85 to 0.85. Accordingly, "dots" to illustrate dot convention are shown. When the mutual coupling is reversed (negative), the differential circuit yields a larger bandwidth but exhibits worse return loss. The value for the coupling coefficient k can vary depending on the overall integrity goals for the link signal. However, the coupling coefficient k for the series inductor $L_{2P}$ and the shunt inductor $L_{1P}$, and the coupling coefficient k for the series inductor $L_2N$ and the shunt inductor $L_{1N}$ should be matched.

FIG. 10 is a differential version of the model described earlier in connection with FIG. 6. The coupling coefficient k is zero or near zero. FIG. 11 is a differential version of the model described earlier in connection with FIG. 5 without the shunt inductor $L_1$. Accordingly, the model of FIG. 11 does not have shunt inductors $L_{1P}$ and $L_{1N}$ of FIGS. 9 and 10.

Figure 12:
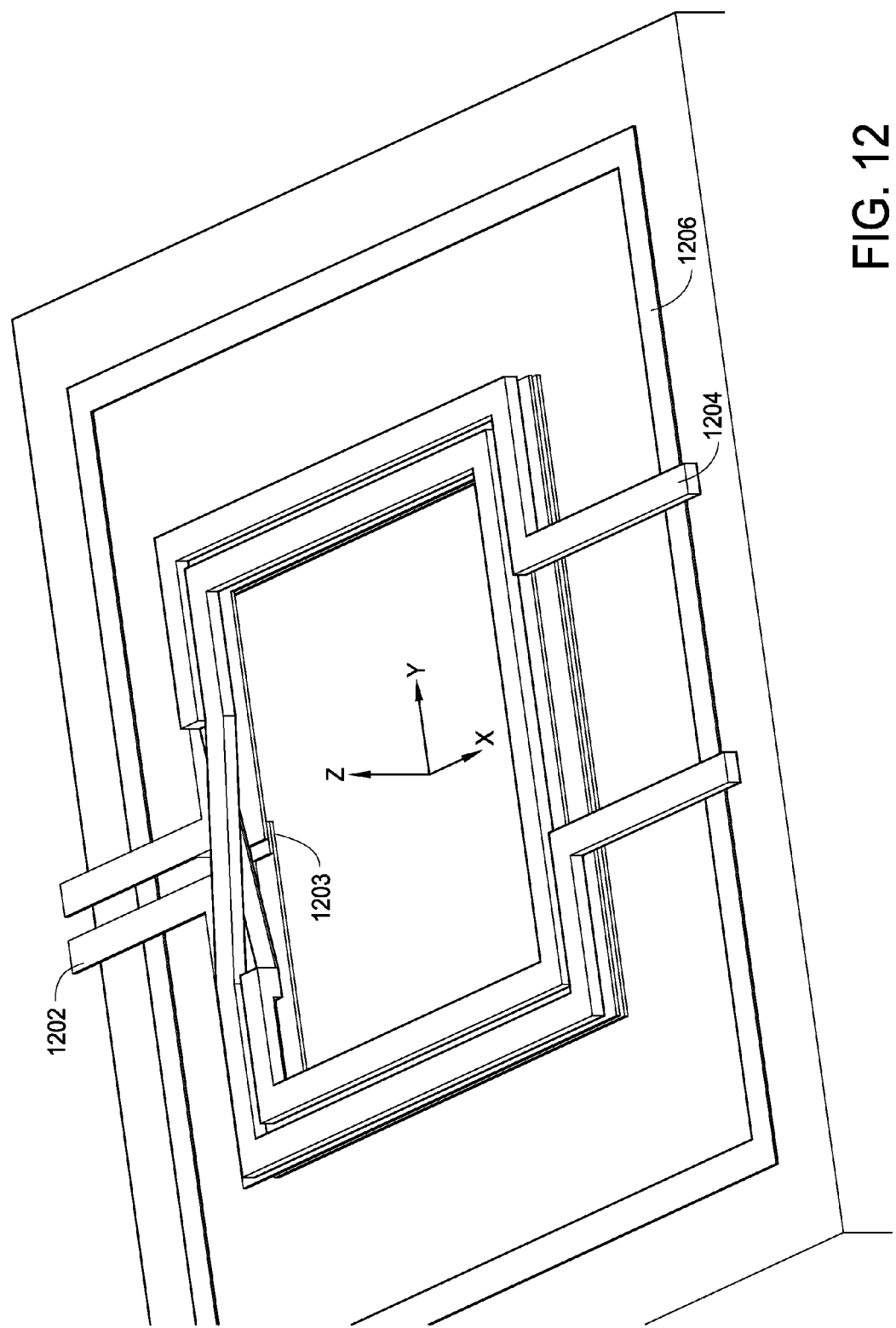
FIG. 12 illustrates an embodiment of inductors sharing a common structure for relatively good mutual coupling.

FIG. 12 illustrates an embodiment of inductors sharing a common structure for relatively good mutual coupling. The illustrated structure is fabricated using multiple metallization and insulation layers. Metal traces 1202 form the shunt inductor $L_1$. The metal traces 1202 include a via 1203 for changing metallization levels. Metal traces 1204 form the series inductor $L_2$. Metal traces 1204 include a bridge for crossing over. Optional metal traces 1206 form a shorted ring that acts as a shield. Other configurations are possible and will be readily determined by one of ordinary skill in the art.

Figure 13:
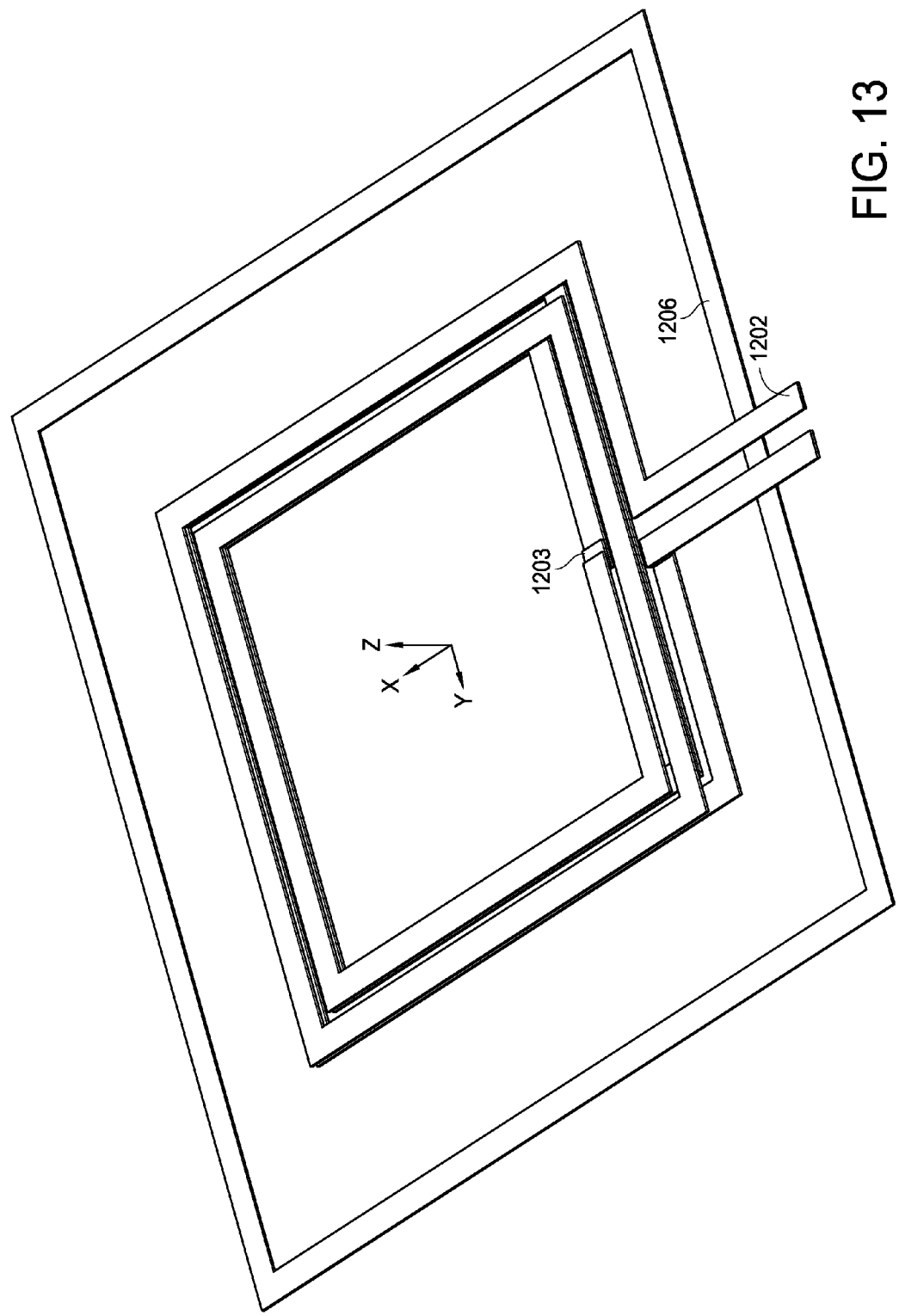
FIG. 13 illustrates one of the inductors of FIG. 12.

FIG. 13 is a view of the metal traces 1202 for the shunt inductor $L_1$ of FIG. 12 without the metal traces 1204 for the series inductor $L_2$ showing for better visibility of the metal traces 1202 of the shunt inductor $L_1$. The metal traces 1202 are formed in two metallization layers. One layer generally spirals in, is joined to the other layer at the via 1203, which then spirals out.

Figure 14:
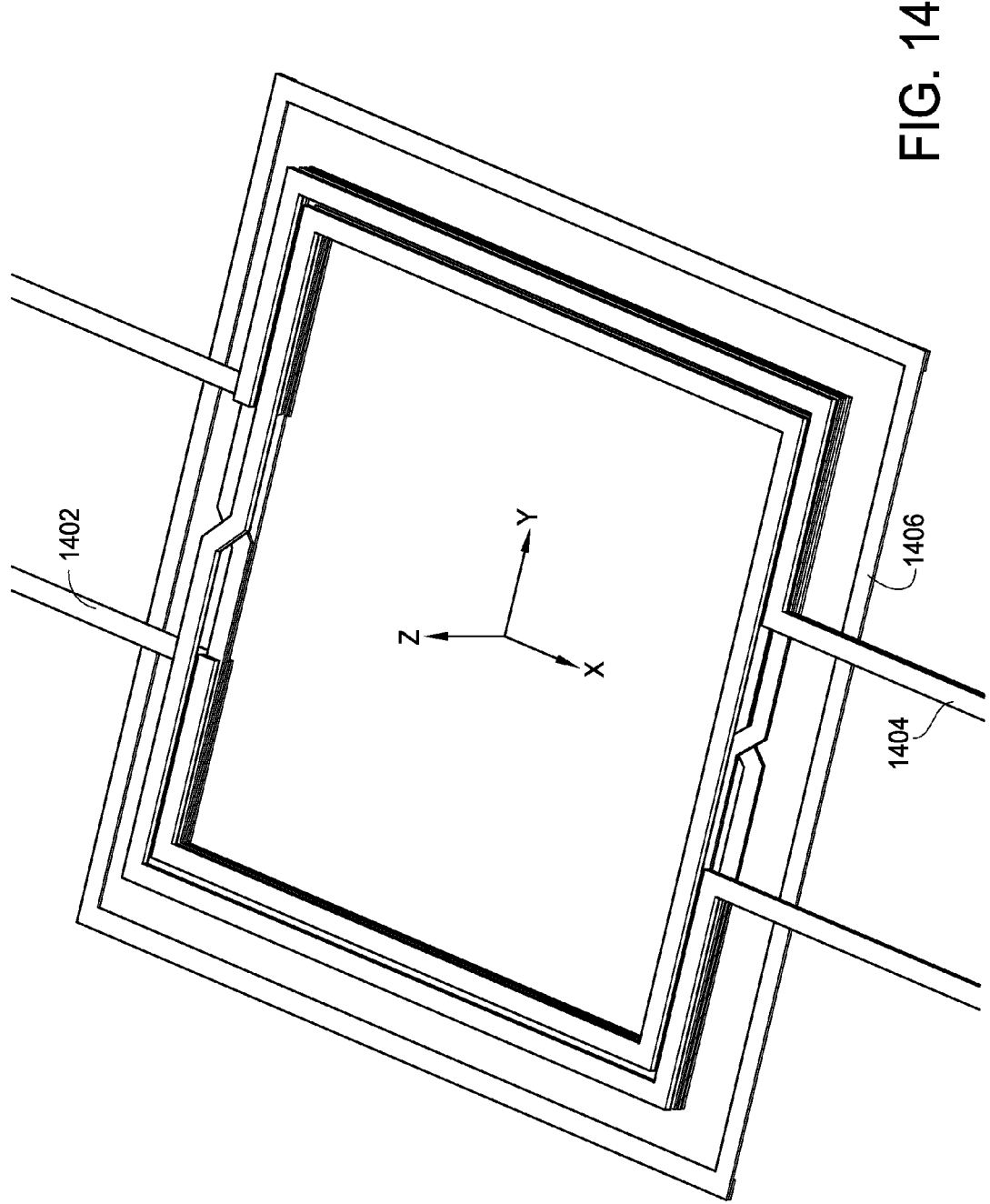
FIG. 14 illustrates an alternative embodiment for inductors for relatively good mutual coupling.

FIG. 14 illustrates an alternative embodiment for inductors having relatively good mutual coupling. In the illustrated embodiment, metal traces 1402 and metal traces 1404 are both of a bridged configuration. Other configurations are possible and will be readily recognized by one of ordinary skill in the art.

The passive receive equalization circuit can also be used to compensate for the frequency distortion of a data link. By selecting component values for peaking or equalization, rather than for maximum bandwidth, the amplitude response for the overall channel can be flattened. The channel can include the transmission line, a package and an on-chip interconnect.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits are not adversely affected).

As used herein, a "node" means any internal or external reference point, connection point, junction, signal line, conductive element, or the like at which a given signal, logic level, voltage, data pattern, current, or quantity is present.

Various embodiments have been described above. Although described with reference to these specific embodiments, the descriptions are intended to be illustrative and are not intended to be limiting. Various modifications and applications may occur to those skilled in the art.

What is claimed is:

1. An apparatus comprising:
   an integrated circuit assembly;
   an input pad disposed on the integrated circuit assembly, wherein the input pad is coupled to a first node;
   a primary electrostatic discharge (ESD) protection circuit of the integrated circuit assembly, wherein the primary ESD protection circuit is coupled to the first node;
   a shunt inductor having a first end and a second end, wherein the first end of the shunt inductor is directly coupled to the first node;
   a termination resistor with an end coupled to a second end of the shunt inductor;
   a secondary ESD protection circuit of the integrated circuit assembly, wherein the secondary ESD protection circuit is coupled to a second node;
   a receiver having an input coupled to the second node, wherein the receiver is configured to receive a serial data signal;
   a current-limiting resistor having a first end coupled to the second node and a second end coupled to a third node; and
   a series inductor having a first end and a second end, wherein the first end is coupled to the first node and wherein the second end is coupled to the third node.

2. The apparatus of claim 1, wherein the shunt inductor and the series inductor substantially overlap physically such that the shunt inductor and the series inductor deliberately exhibit mutual coupling.

3. The apparatus of claim 1, wherein the shunt inductor and the series inductor substantially overlap physically such that the shunt inductor and the series inductor deliberately exhibit mutual coupling, wherein the voltage polarity of the mutual coupling is aligned such that the first node of the shunt inductor and the first node of the series inductor are in-phase with respect to voltage induced by magnetic coupling.

4. The apparatus of claim 1, wherein the shunt inductor and the series inductor have a coupling coefficient k of at least 0.2 in magnitude.

5. The apparatus of claim 1, wherein the shunt inductor and the series inductor have a coupling coefficient k between 0.3 and 0.6 in magnitude.

6. The apparatus of claim 1, wherein the shunt inductor and the series inductor have a coupling coefficient k between 0.45 and 0.7 in magnitude.

7. The apparatus of claim 1, wherein the shunt inductor and the series inductor have a coupling coefficient k between 0.5 and 0.85 in magnitude.

8. The apparatus of claim 1, wherein the shunt inductor and the series inductor have a coupling coefficient k between −0.85 and 0.85.

9. The apparatus of claim 1, wherein the first node is routed such that the primary ESD protection circuit is disposed in a signal path between the input pad and any of the first end of the shunt inductor or the first end of the series inductor.

10. The apparatus of claim 1, wherein the shunt inductor has at least 0.1 nanohenries (nH) of inductance, and wherein the series inductor has at least 0.1 nH of inductance.

11. The apparatus of claim 1, wherein the input pad, the primary ESD protection circuit, the shunt inductor, the termination resistor, the secondary ESD protection circuit, the receiver, and the series inductor, form a circuit for a single-ended input signal, the termination resistor having a resistance being matched to an intended transmission channel, wherein a second end of the termination resistor is coupled to a voltage reference.

12. The apparatus of claim 1, wherein the input pad, the primary ESD protection circuit, the shunt inductor, the secondary ESD protection circuit, the receiver and the series inductor form a circuit for a positive portion of a differential input signal, wherein the termination resistor has a resistance of about twice the characteristic impedance of an intended transmission channel, further comprising:
   a second input pad disposed on the integrated circuit assembly, wherein the second input pad is coupled to a fourth node, wherein the second input pad is configured to receive a negative portion of the differential input signal;

a second primary ESD protection circuit of the integrated circuit assembly, wherein the second primary ESD protection circuit is coupled to the fourth node;

a second shunt inductor having a first end and a second end, wherein the first end is coupled to the fourth node, wherein the second end is coupled to a second end of the termination resistor;

a second secondary ESD protection circuit of the integrated circuit assembly, wherein the second secondary ESD protection circuit is coupled to a fifth node;

a second current-limiting resistor having a first end coupled to the fifth node and a second end coupled to a sixth node;

a second series inductor having a first end and a second end, wherein the first end is coupled to the fourth node and wherein the second end is coupled to the sixth node.

13. The apparatus of claim 12, wherein the shunt inductor and the series inductor, and the second shunt inductor and the second series inductor have a coupling coefficient k having an absolute value of at least 0.2.

14. The apparatus of claim 12, wherein the shunt inductor and the series inductor, and the second shunt inductor and the second series inductor have a coupling coefficient k that is negative and has an absolute value of at least 0.2.

15. The apparatus of claim 1, wherein the current-limiting resistor comprises parasitic trace resistance, explicit resistance, or both parasitic trace resistance and explicit resistance.

16. The apparatus of claim 1, wherein:
the input pad is directly coupled to the first node;
the first end of the series inductor is directly coupled to the first node; and
the second end of the series inductor is directly coupled to the third node.

17. An apparatus comprising:
an integrated circuit assembly;
an input pad disposed on the integrated circuit assembly, wherein the input pad is coupled to a first node;
a primary electrostatic discharge (ESD) protection circuit of the integrated circuit assembly, wherein the primary ESD protection circuit is coupled to the first node;
a termination resistor with an end coupled to the first node;
a single secondary ESD protection circuit of the integrated circuit assembly, wherein the secondary ESD protection circuit is coupled to a second node;
a receiver having an input coupled to the second node, wherein the receiver is configured to receive a serial data signal;
a current-limiting resistor having a first end coupled to the second node and a second end coupled to a third node; and a single series inductor having a first end and a second end, wherein the first end is coupled to the first node and wherein the second end is coupled to the third node, wherein there are no other inductors between the first node and the second node than the single series inductor, wherein the first node is routed such that the primary ESD protection circuit is disposed in a signal path between the input pad and the first end of the series inductor.

18. The apparatus of claim 17, wherein the series inductor has at least 0.1 nanohenries (nH) of inductance.

19. The apparatus of claim 17, wherein the input pad, the primary ESD protection circuit, the termination resistor, the secondary ESD protection circuit, the receiver, and the series inductor, form a circuit for a single-ended input signal, wherein the termination resistor has a resistance being matched to an intended transmission channel, wherein a second end of the termination resistor is coupled to a voltage reference.

20. The apparatus of claim 17, wherein the input pad, the primary ESD protection circuit, the secondary ESD protection circuit, the receiver, and the series inductor, form a circuit for a positive portion of a differential input signal, wherein the termination resistor has a resistance of about twice the characteristic impedance of an intended transmission channel, further comprising:

a second input pad disposed on the integrated circuit assembly, wherein the second input pad is coupled to a fourth node, wherein the second input pad is configured to receive a negative portion of the differential input signal;

a second primary ESD protection circuit of the integrated circuit assembly, wherein the second primary ESD protection circuit is coupled to the fourth node;

a second secondary ESD protection circuit of the integrated circuit assembly, wherein the second secondary ESD protection circuit is coupled to a fifth node;

a second current-limiting resistor having a first end coupled to the fifth node and a second end coupled to a sixth node;

a second series inductor having a first end and a second end, wherein the first end is coupled to the fourth node and wherein the second end is coupled to the sixth node.

21. The apparatus of claim 17, wherein the current-limiting resistor comprises parasitic trace resistance, explicit resistance, or both parasitic trace resistance and explicit resistance.

* * * * *